May 1, 1934.  P. W. SCHIPPER, JR  1,957,359
OVERSPEED TRANSMISSION MECHANISM
Filed July 12, 1932  4 Sheets-Sheet 1
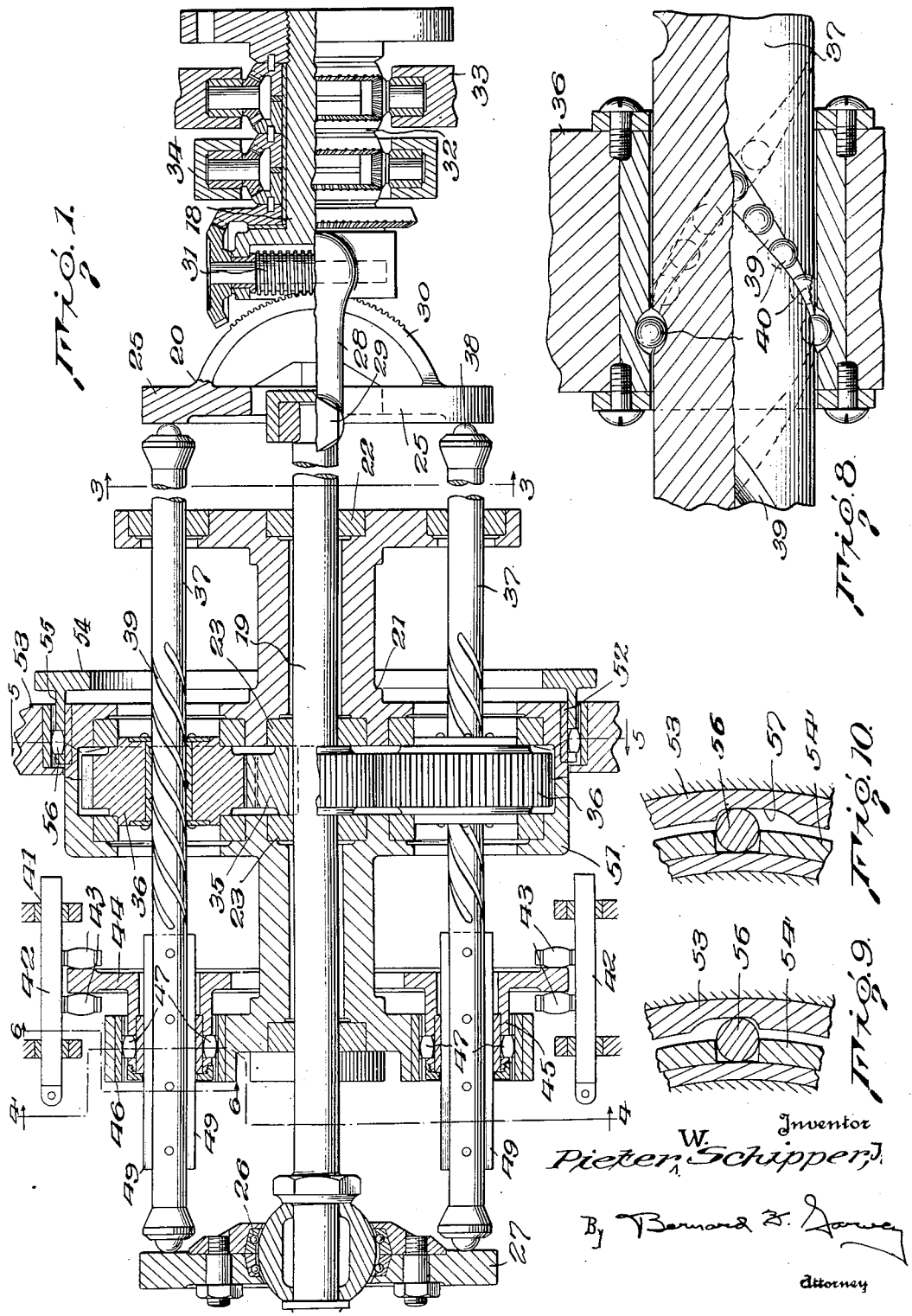
Inventor
Pieter W. Schipper, Jr.
By Bernard F. Dowey
Attorney

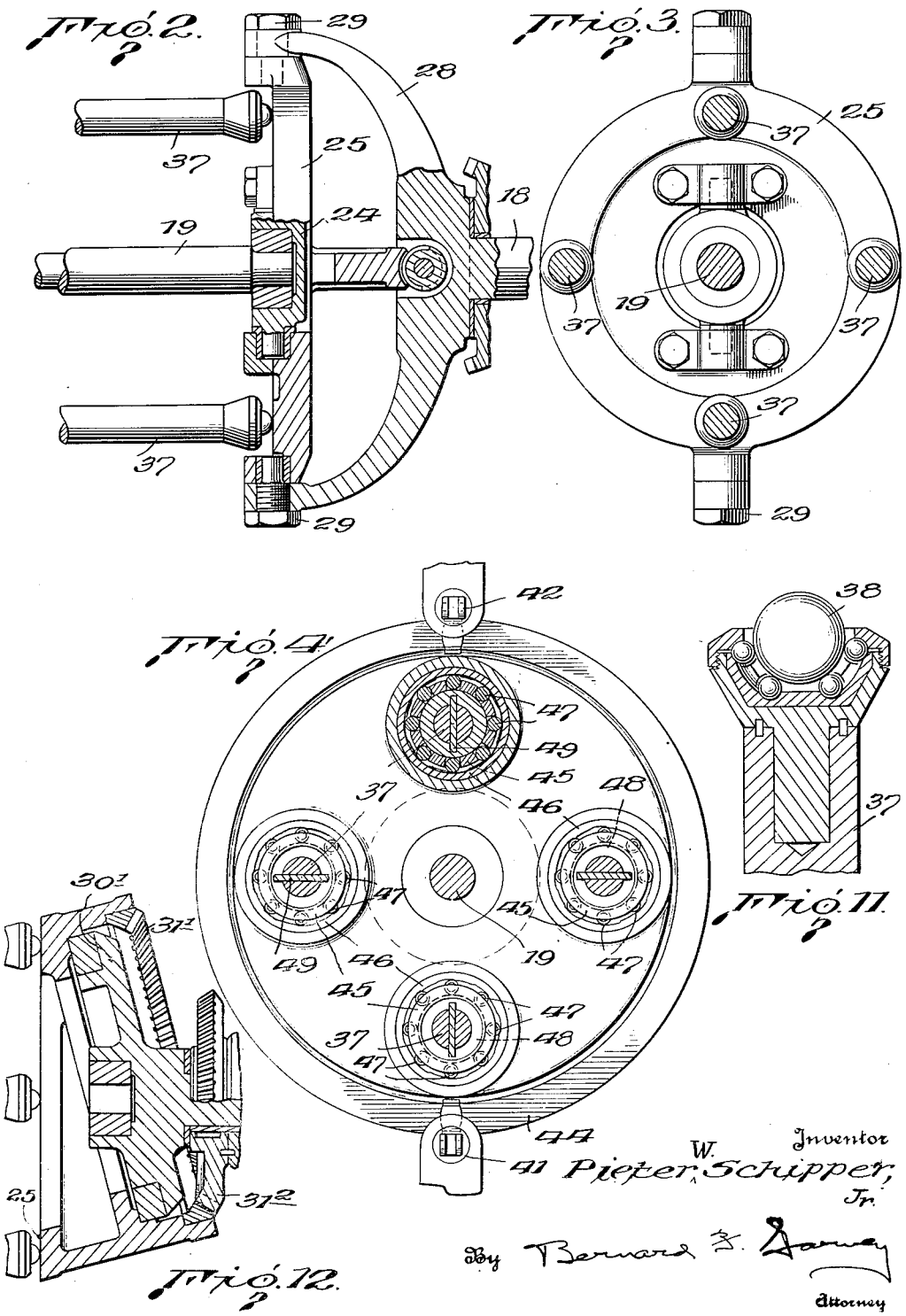

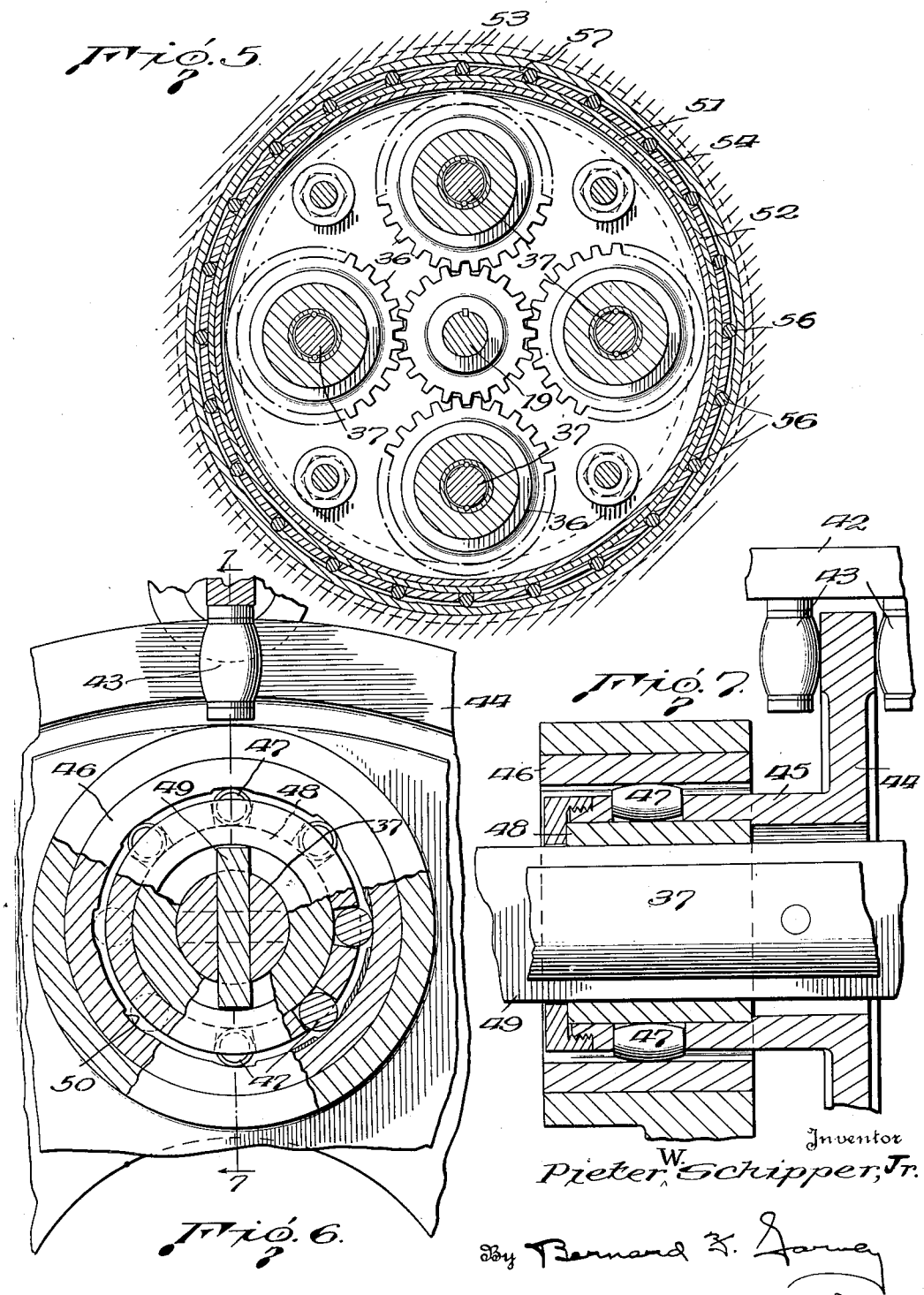

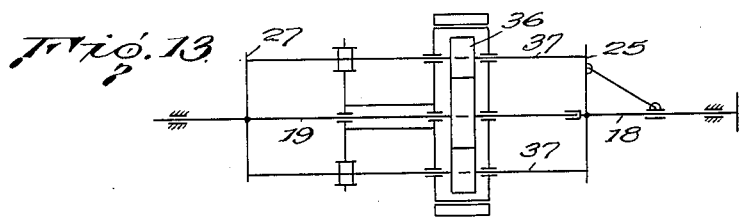
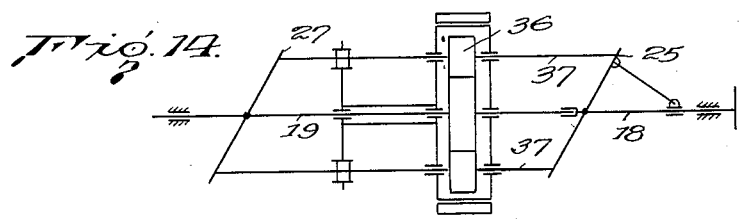
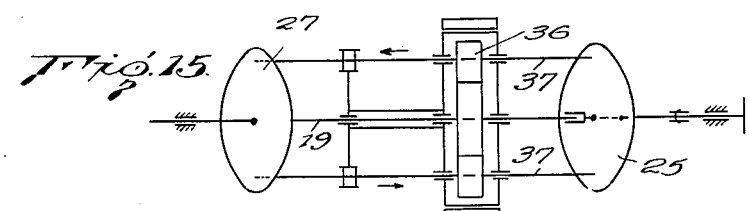
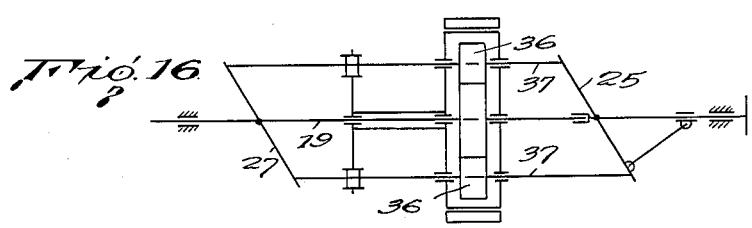
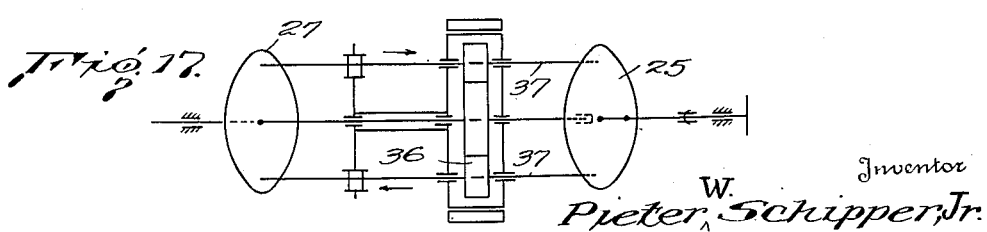

Patented May 1, 1934

1,957,359

UNITED STATES PATENT OFFICE 1,957,359

OVERSPEED TRANSMISSION MECHANISM

Pieter W. Schipper, Jr., Alpine, N. J.

Application July 12, 1932, Serial No. 622,137

12 Claims. (Cl. 74—54)

The present invention consists of overspeed transmission mechanism having for an object to vary the velocity ratio between a drive shaft and a driven shaft by a driving system which is primarily indirect, but automatically directly connects the drive shaft and driven shaft when a predetermined position is attained.

Another object of the invention is to embody in the transmission a gearing system operable from the drive shaft by a series of successively operable reciprocating elements to gradually increase the velocity ratio between the drive shaft and driven shaft up to a predetermined speed, at which point a direct drive between the two shafts is effected and the ratio remains constant.

A further object of the invention is to provide an overspeed transmission including gears equipped with an over-running unit which allows freedom of movement of the gears in one direction, while movement in the opposite direction is restrained by suitable reciprocating means.

Other objects of the invention will be apparent from the following description of the present preferred forms thereof, taken in connection with the accompanying drawings, wherein Fig. 1 is a longitudinal sectional view of transmission mechanism constructed in accordance with the present invention, portions being broken away to disclose details;

Fig. 2 is a detail, side elevational view, partly in section, of the connection means between the driving shaft and driven shaft, certain of the reciprocating elements being shown fragmentarily;

Fig. 3 is a transverse sectional view, taken on the line 3—3 of Fig. 1, looking in the direction of the arrows;

Fig. 4 is a transverse sectional view, taken on the line 4—4 of Fig. 1, looking in the direction of the arrows;

Fig. 5 is a transverse sectional view, taken on the line 5—5 of Fig. 1, looking in the direction of the arrows;

Fig. 6 is a transverse sectional view, taken on the line 6—6 of Fig. 1, looking in the direction of the arrows;

Fig. 7 is a sectional view on the line 7—7 of Fig. 6, looking in the direction of the arrows, showing the details of one of the reciprocating rod control units;

Fig. 8 is a detail, fragmentary sectional view, taken through one of the pinion gears, showing the manner of mounting a reciprocating rod therein;

Fig. 9 is a detail fragmentary sectional view, taken through the over-running unit of the cage control unit, showing the cage control unit in one extreme position;

Fig. 10 is a similar view, showing the cage control unit in an opposite extreme position;

Fig. 11 is a fragmentary longitudinal sectional view of one of the terminals of a reciprocating rod used in the present invention;

Fig. 12 is a detail, fragmentary sectional view of a modified form of the disc adjusting means;

Fig. 13 is a diagrammatical view of the transmission in neutral position;

Fig. 14 is a similar view, showing the discs at a predetermined angle, which fixes the ratio of revolutions between the driving shaft and the driven shaft;

Fig. 15 is a similar view after each of the reciprocating rods has accomplished one-half stroke in different directions;

Fig. 16 is a similar view, showing the position of the discs after the reciprocating rods have completed full strokes and are starting on a return stroke; and, Fig. 17 is a similar view, showing the position of the discs when the reciprocating rods have taken a one-half back stroke.

A form of the invention used to illustrate the principle is shown in the drawings and consists of a drive shaft 18 and a driven shaft 19, engaged by suitable connection means, generally designated 20. The driven shaft 19 is mounted in the bore of a body member, generally designated 21, the diameter of the bore being in excess of the diameter of the driven shaft and being provided with terminal bearings 22 and intermediate bearings 23 in which the shaft is rotatably mounted. The ends of the driven shaft project beyond the ends of the body member 21, one end thereof being journalled in a bearing block 24 which is detachably mounted centrally in a disc 25, the latter forming part of the connection means between the drive shaft and driven shaft. The opposite end of the driven shaft is rotatably mounted, as indicated at 26, in a disc 27, the latter being capable also of oscillatory movement on said shaft for a purpose more fully hereinafter described.

The drive shaft 18 is equipped with a yoke 28, the ends of which are formed to provide bearings through which suitable securing means 29 pass, for engagement in the periphery of the disc 25. It is consequently apparent that rotation of the drive shaft 18 correspondingly rotates the disc 25.

For the purpose of changing the angularity of the disc 25, I show certain mechanism in Fig. 1 and a modified form in Fig. 12, of the drawings. In Fig. 1 this mechanism consists of a segmental gear 30 carried by the disc 25, which meshes with a worm screw 31, the latter being rotated through the instrumentality of a train of mating gears 32. These gears are carried by a fixed body 33 and motion may be imparted to the gears by a ring 34. Rotation of the ring 34 imparts movement to the gear train 32 to correspondingly rotate, in a manifest manner, the worm screw 31, which in turn feeds the segment 30 to vary the angularity of the disc with respect to the drive shaft and driven shaft. In the modified form of disc adjusting means shown in Fig. 12, I show an angularly disposed block 30' which is mounted on the drive shaft and is equipped with a bearing, which supports disc 25, said disc being provided with an internal bevelled gear 31', the latter being engaged by a complemental gear $31^2$, carried by the drive shaft. As is apparent, rotation of the gear $31^2$ correspondingly imparts rotation to the gear 31', which, of course, determines the angle of the disc 25. The rotation of the gear $31^2$ is accomplished by operation of the ring 34.

The mechanism further contemplates the use of a suitable gearing, the central or primary gear 35 of which is fixedly secured to the driven shaft 19, while the pinion or secondary gears 36 radiate therefrom and are adapted for the reception of reciprocating rods 37. As advantageously illustrated in Figs. 1 and 5 of the drawings, one of the reciprocating rods is mounted in the bore of each of the pinion or secondary gears. The ends of the rods are adapted for frictional engagement with the inner faces of the discs 25 and 27, each of said ends being equipped with suitable antifriction bearing means 38. Midway the ends of each rod 37 is a spirally formed groove 39 which is adapted for the reception of ball bearings 40. The bearings 40 likewise engage a complemental spiral ball race formed in the bore of each pinion gear 36. As shown to adavntage in Fig. 8, the ball race in the bore of the secondary or pinion gear complements the spiral groove in the periphery of the rod 37.

It now becomes manifest that movement of the disc 25 to vary the angularity thereof correspondingly moves the rods 37 in order to urge the disc 27 into an angular position parallel with the disc 25. Rotation of the disc 25 by the drive shaft, in a manner already described, imparts a reciprocatory motion to the rods 37 to rotate the pinion gears, which in turn impart movement to the driven shaft through the central gear 35. To effect rotation of the rods 37 in either direction and to prevent rotation thereof when desired, suitable means must be provided and for this purpose I have chosen to employ a control unit for the rods which I have generally designated 41. The control unit includes bars 42 equipped with roller bearings 43 which embrace the opposite sides of a movable clutch element 44, which latter includes sleeves 45, one of each of which is concentrically mounted within a complemental clutch member 46, formed in the body 21. Each of the sleeves 45 carries roller bearings 47 which are independently rotatable and transversely movable as a unit with the clutch member 44. As illustrated to advantage in Figs. 6 and 7, each of the rods 37 has a sleeve 48 keyed thereto, as indicated at 49, said sleeve 48 being spaced from the clutch member 46 to permit interpositioning of the elements of the clutch 44 between said sleeve 48 and the clutch 46. It will be noted from Fig. 6 that the inner periphery of the clutch member 46 is provided with grooves 50 to provide cam surfaces to be impinged by the roller bearings 47. When the clutch elements 44 and 46 are as shown in Fig. 7, a neutral position attains, permitting the rod to rotate in either direction. When the clutch element 44 is moved in order to urge the elements thereof left of the position shown in Fig. 7 of the drawings, the rod can move only in a counterclockwise direction looking from the driving end. When the clutch element 44 is moved to the right of the position shown in Fig. 7, looking from the same end, the rod can rotate only in a clockwise direction.

It is the desideratum of the present invention to directly connect the drive shaft with the driven shaft and for this purpose a gear cage is provided with a cage control mechanism including an over-running unit. The gear cage, which houses the gearing mechanism, is indicated at 51 and is formed intermediate the ends of the body member 21. The outer periphery of the cage, as shown in Fig. 5 of the drawings, is equipped with a band 52, which is circumscribed by an over-running unit 53, the inner periphery of the over-running unit being spaced from the cage band by the cage control unit proper, consisting of a frame 54 with a laterally projecting annulus 55, which latter carries a series of roller bearings 56. The roller bearings 56, as shown to advantage in Fig. 5, engage the outer periphery of the cage band 52 and are also adapted for engagement in transversely extending recesses 57 formed at intervals in the inner periphery of the over-running unit 53. The over-running unit is secured to a fixed body. Consequently, when the frame 54 is in one position, as that illustrated in Fig. 9, the cage is locked from movement in one direction, and correspondingly when in a second position as in Fig. 10, the cage is locked from movement in the other direction.

From the above it is apparent that the driven shaft 19 is rotatably mounted in the discs 25 and 27 and that the angularity of the disc 25 may be varied at the option of the operator to control the extent of the strokes of the reciprocating rods 37. Adjustment of the disc 25 correspondingly varies the degree of angularity of the disc 27, the faces of the two discs at all times remaining parallel. The smaller the angle of the planes of the discs 25 and 27 with the horizontal, the greater the strokes of the rods 37. The length of the stroke of the rods 37 corresponds with a predetermined fraction of one revolution of the driven shaft 19. The longer the stroke, the greater the fraction and when the driving shaft 18 makes one complete revolution, the reciprocating rods 37 have completed one cycle of movement, to wit, a forward and back stroke. The angularity of the discs 25 and 27 also determines the ratio of number of revolutions of the driving shaft 18 and the driven shaft 19. The greater the angle of the plane of the discs with the horizontal, the higher the ratio between the shafts. The reciprocating rods 37 may be prevented from rotating by the control unit which has herein been generally designated 41, and when rotation of the rods on the forward stroke is restrained, the corresponding pinion gears rotate in one direction. On the back stroke, the reciprocating rods 37 will rotate and the pinion gears will remain stationary. When the position of the control unit 41 is reversed, the reciprocating rods rotate during the forward stroke and the pinion gears remain statonary; while during the back stroke, the rods do not rotate and the pinion gears rotate. The direction of movement of the central gear 35 is of course, determined by the position of the control unit 41.

Reverse rotation of the drive shaft 18 does not affect the driven shaft. In assuming the above operation, it is likewise assumed that the cage of the over-running unit 53 is in a fixed position, in which position the reciprocating rods are impotent to rotate the cage in the same direction as the driving shaft, since the force of the meshing gears applies a stress in the opposite direction. The cage must, of course, be prevented from rotating against the direction of the driving shaft and this is taken care of by the over-running unit 53. When the movement due to the reciprocating rods 37 surpasses the movement required to overcome the resistance of the driven shaft 19, the cage of the over-running unit starts to rotate in the direction in which the driving shaft rotates. The reciprocating rods 37 at this point stop working and a direct coupling is effected between the driving shaft 18 and the driven shaft 19, with a complete absence of internal friction.

It is, of course, to be understood that the mechanism herein shown is for the purpose only of illsutrating the application of the invention. I am aware that various changes may be made therein, especially in the details of construction, proportion and arrangement of the parts, within the scope of the claims hereto appended.

What is claimed is:

1. In a transmission mechanism, a drive shaft and a driven shaft, mechanism operatively connecting said shafts including primary and secondary gearing and reciprocating rods, the latter being rotatable in and movable through the secondary gears upon rotation of the drive shaft for imparting motion through said gearing to the driven shaft, means cooperating with said mechanism for reversing rotation of the secondary gears and means cooperating with said mechanism for progressively increasing the torque of the driven shaft by progressive decrease of the reciprocation of the rods.

2. In a transmission mechanism, a drive shaft and a driven shaft, mechanism operatively connecting said shafts including primary and secondary gearing and reciprocating rods, the latter being movable through the secondary gears upon rotation of the drive shaft for imparting motion through said gearing to the driven shaft, means in said mechanism for effecting drive in either direction, further means being included in said mechanism to vary the strokes of the rods and correspondingly varying the velocity ratio between the drive shaft and driven shaft, and reversible releasable means cooperating with said mechanism to restrict rotation of the secondary gears to their own axes.

3. In a transmission mechanism including a drive shaft and a driven shaft, mechanism operatively connecting said shafts including primary and secondary gearing, the primary gear of which is fixed on the driven shaft, a rotary reciprocating rod mounted in each of the secondary gears of the system, means forming a connection between the drive shaft and rods, and selective rotation control means for said gearing cooperating with said mechanism for periodically restraining said rods from rotation to effect a rotation of the secondary gears.

4. In a transmission mechanism, a drive shaft and driven shaft, means operatively connecting said shafts including primary and secondary gearing and reciprocating rods operable in both directions as integral units in positive threaded engagement with the secondary gears, the rods being movable through the secondary gears upon the operation of the drive shaft for imparting motion through said gearing to the driven shaft, said mechanism further including discs frictionally engaging the ends of said rods.

5. In transmission mechanism including a drive shaft and driven shaft, a gearing system surrounding the driven shaft and engaged therewith, means reciprocably mounted through certain of the gears of said system and in operative connection with the drive shaft to transmit motion to the driven shaft upon the operation of the drive shaft, and means cooperating with said gearing system for restricting rotation of the last said gears to either direction or allowing rotation in either direction.

6. In transmission mechanism including a drive shaft and driven shaft, a gearing system surrounding the driven shaft and engaged therewith, means rotatably and reciprocably mounted through certain of the gears of said system and in operative connection with the drive shaft to transmit forward or reverse motion to the driven shaft upon the operation of the drive shaft, a unit cooperating with said gearing system for controlling the direction of rotational movement of said reciprocating means about its own axis and selective means cooperating with the mechanism for restricting rotational movement of said reciprocable means to its own axis.

7. In transmission mechanism, a drive shaft and a driven shaft, means including rotatable and reciprocable elements for operatively connecting said shafts to effect variable indirect transmission of power from the drive shaft to the driven shaft in either direction, and selective means responsive to load conditions at plural variable indirect driving ratios for directly connecting the drive shaft and driven shaft when a predetermined speed attains in either direction.

8. In a transmission mechanism including a drive shaft and drive shaft, rotatable and reciprocable means connecting said shafts, means to vary the velocity ratio between the drive shaft and driven shaft including a gearing system and a longitudinally adjustable over-running unit coacting with said first means, means cooperating with the mechanism to control the direction of movement of said gearing and means for adjusting said over-running unit.

9. A transmission mechanism comprising a drive shaft and a driven shaft, means including rotatable and reciprocable elements for coupling said shafts for a torque ratio greater than unity, means responsive to the load on the mechanism for reducing the torque ratio to unity and selective means cooperating with the mechanism for rotation control of the coupling means about their own axes.

10. A transmission mechanism comprising a drive shaft, a driven shaft and means for coupling said shafts, said means comprising primary and secondary gears, rotary reciprocable means having a variable stroke associated with said means for controlling the speed of the driven shaft, means cooperating with the mechanism for determining the stroke of said reciprocable means and means cooperating with the mechanism for restraining rotation of said reciprocable means in both directions.

11. A transmission mechanism comprising a drive shaft and a driven shaft, means for coupling said shafts comprising a primary gear carried by said driven shaft and secondary gears for driving the primary gear threadedly receiving rods actuated by said drive shaft, means cooperating with the mechanism for adjusting the amplitude of the rod movements, means associated with said rods for restricting the rod rotation in both directions and means associated with said rods for effecting freedom of rotation of said rods.

12. A transmission mechanism comprising a drive shaft and a driven shaft, means for coupling said shafts including reciprocable elements rotatable about their own axes, means associated with said drive shaft for actuating said elements and means associated with said elements for rendering their reciprocation by the drive shaft ineffective for a plurality of amplitudes upon the driven shaft.

PIETER W. SCHIPPER, Jr.